(12) United States Patent
Gao et al.

(10) Patent No.: US 9,201,551 B2
(45) Date of Patent: Dec. 1, 2015

(54) CAPACITIVE TOUCH SCREEN

(71) Applicant: Nanchang O-Film Tech. Co., Ltd., Nanchang (CN)

(72) Inventors: Yulong Gao, Nanchang (CN); Ying Gu, Nanchang (CN); Yunhua Zhao, Nanchang (CN); Guanglong Xie, Nanchang (CN)

(73) Assignee: Nanchang O-Film Tech. Co., Ltd., Nanchang, Jiangxi (CN)

( * ) Notice: Subject to any disclaimer, the term of this patent is extended or adjusted under 35 U.S.C. 154(b) by 269 days.

(21) Appl. No.: 14/000,093

(22) PCT Filed: Jul. 6, 2013

(86) PCT No.: PCT/CN2013/078948
§ 371 (c)(1),
(2) Date: Aug. 16, 2013

(87) PCT Pub. No.: WO2014/153899
PCT Pub. Date: Oct. 2, 2014

(65) Prior Publication Data
US 2014/0293152 A1    Oct. 2, 2014

(30) Foreign Application Priority Data

Mar. 28, 2013  (CN) .......................... 2013 1 0104728

(51) Int. Cl.
G06F 3/041    (2006.01)
G06F 3/044    (2006.01)

(52) U.S. Cl.
CPC ...... *G06F 3/044* (2013.01); *G06F 2203/04103* (2013.01)

(58) Field of Classification Search
CPC .......... G06F 3/044; G06F 2203/04112; H05K 1/0296; H05K 1/0287; H05K 2201/0108; H05K 2201/09681
USPC .................................................. 345/156–184
See application file for complete search history.

(56) References Cited

U.S. PATENT DOCUMENTS

2008/0138589 A1 *  6/2008  Wakabayashi et al. .... 428/195.1
(Continued)

FOREIGN PATENT DOCUMENTS

| CN | 101988999 A | 3/2011 |
| CN | 102262491 A | 11/2011 |
| CN | 102346588 A | 2/2012 |
| CN | 102722279 A | 10/2012 |

(Continued)

*Primary Examiner* — Kent Chang
*Assistant Examiner* — Nelson Rosario
(74) *Attorney, Agent, or Firm* — Coats & Bennett, P.L.L.C.

(57) ABSTRACT

A capacitive touch screen is disclosed in the present invention, including: a transparent substrate, including a first surface and a second surface opposite to the first surface; a light-shield layer formed on the edge of the first surface of the transparent substrate, which forms a non-visible area; and a transparent polymer layer formed on the first surface, which is opposite to the first surface and covers the light-shield layer, a part of the transparent polymer layer covering the light-transmission area of the transparent substrate forms a sensing area, a surface of that is patterned to form a first meshed conductive trench, which is filled with a conductive material. The defined conductive trench reduces the scratching to the conductive material when the capacitive touch screen is in use, and the use of the trench structure reduces the covering area of the conductive material, the contact resistance and the cost.

13 Claims, 5 Drawing Sheets

(56) References Cited

U.S. PATENT DOCUMENTS

| | | | |
|---|---|---|---|
| 2009/0085885 A1* | 4/2009 | Wu et al. | 345/173 |
| 2009/0219257 A1* | 9/2009 | Frey et al. | 345/173 |
| 2009/0219258 A1* | 9/2009 | Geaghan et al. | 345/173 |
| 2012/0098781 A1 | 4/2012 | Kim et al. | |
| 2014/0116754 A1 | 5/2014 | Gao et al. | |

FOREIGN PATENT DOCUMENTS

| | | |
|---|---|---|
| CN | 102903423 A | 1/2013 |
| CN | 202677865 U | 1/2013 |
| CN | 102930922 A | 2/2013 |
| KR | 20110123232 A | 11/2011 |
| KR | 20120041529 A | 5/2012 |

* cited by examiner

CAPACITIVE TOUCH SCREEN

FIELD OF THE INVENTION

The present invention relates to a field of touch screen, and more particularly relates to a capacitive touch screen.

BACKGROUND OF THE INVENTION

The touch screen is also known as "touch screen" or "touch panel", it is an induction liquid crystal display device which can receive an input signal of contact and the like, when the graphic buttons on the screen are touched, the tactile feedback system can drive a variety of coupling devices according to pre-programmed program, it can be used to replace the mechanical button panel, and create a vivid audio and video effects by a liquid crystal display. According to the working principle of the touch screen and information transmission medium, the types of the touch screen can be divided into resistive type, capacitance induction type, infrared type as well as surface acoustic wave type, the capacitive touch screen is one of the most widely used at present.

The capacitive touch screen functions by using the body's current sensing, when fingers touch the metal layer, the user and the surface of capacitive touch screen cooperatively form a coupling capacitor, so fingers take a small current away from the contact point. The current outflows from the electrodes of the four corners of the capacitive touch respectively, and the current of the four electrodes is proportional to the distance between the finger and the four corners, the controller gets the touch point position by calculating the ratio of the four current accurately.

The most commonly used capacitive touch screen uses one glass solution (OGS) technology, a transparent indium tin oxide (ITO) conductive film and sensor are directly formed on a protective glass, a piece of glass plays a dual role of protecting the glass and touch sensor. However, the conductive material in the integrated touch technology is arranged on the surface of the glass, the conductive material is easily scratched, thereby the capacitive touch screen is damaged and can not be normally used. The mainly material used in the integrated touch technology is indium tin oxide, the mainly material of the indium tin oxide is indium, the cost is high, and the resistance of the indium tin oxide is relatively large when the big size screen is prepared, the sensitivity is poor; and in the production process of the touch screen, bonding the conductive thin film layer is needed, and the glass is bonded, such that the thickness is increased, and a process of bonding the glass is added, the production costs go up.

SUMMARY OF THE INVENTION

In order to solve the problems that the touch screen used in the integrated touch technology is easily scratched, with high cost and high resistance, one object of the present invention is to provide a low-cost and low resistance capacitive touch screen which the screen is not easily scratched.

A capacitive touch screen includes:

a transparent substrate includes a first surface and a second surface opposite to the first surface;

a light-shield layer formed on the edge of the first surface of the transparent substrate, the light-shield layer forms an non-visible area on the first surface of the transparent substrate; and a transparent polymer layer formed on the first surface of the transparent substrate covers the light-shield layer, the transparent polymer layer is opposite to the first surface of the transparent substrate, a part of the transparent polymer layer covering a light-transmission area of the transparent substrate forms a sensing area, a surface of the sensing area is patterned to form a first meshed conductive trench, the conductive trench is filled with a conductive material.

In one embodiment, a width of the trench is defined as $d_1$, a depth of the trench is defined as $h$, $1\ \mu m \le d_1 \le 5\ \mu m$, $2\ \mu m \le h \le 6\ \mu m$, $h/d_1 > 1$.

In one embodiment, the conductive material is nano-conductive metal.

In one embodiment, a ratio of the area covered by the conductive material and the sum area of the first mesh is less than 5%.

In one embodiment, the first mesh is a polygonal mesh, a side length of the polygon mesh is defined as $a$, $150\ \mu m \le d_1 \le 500\ \mu m$.

In one embodiment, a width of the non-visible area is defined as $d_2$, $150\ mm \le d_2 \le 500\ mm$.

In one embodiment, the transparent polymer layer is opposite to the first surface of the transparent substrate, a part of the transparent polymer layer covering the non-visible area forms a traces area, a surface of the traces area is patterned to form a second meshed traces trench, the traces trench is filled with the conductive material.

In one embodiment, the traces trench of the traces area is communicated with the conductive trench of the sensing area via a node.

In one embodiment, the sensing area defines a connecting trench on a portion connecting to the traces area, the connecting trench is filled with the conductive material, the traces trench is communicated with the conductive trench by communicating with the connecting trench, respectively.

In one embodiment, a density of the second mesh formed by the traces area is greater than a density of the first mesh formed by the sensing area.

In one embodiment, the capacitive touch screen further includes a transparent protective layer, the transparent protective layer covers the surface of transparent polymer layer removed the part of the lead output of the traces area.

In one embodiment, the transparent protective layer is made of material selected from the group consisting of UV adhesive, embossing adhesive, and polycarbonate.

In one embodiment, the transparent polymer layer is made of material selected from the group consisting of UV adhesive, embossing adhesive, and polycarbonate.

In one embodiment, the light-shield layer is made of ink.

In one embodiment, the transparent substrate is glass.

In the capacitive touch screen, a conductive trench is defined on a surface of the capacitive touch screen, which can reduce the scratching to the conductive material when using the capacitive touch screen, and the use of the trench structure reduces the coverage area of the conductive material, and reduces the contact resistance and the cost of production.

DETAILED DESCRIPTION OF THE EMBODIMENTS

A capacitive touch screen has a surface defining a conductive trench, which can reduce the scratching to the conductive material when using the capacitive touch screen, and the coverage area of the conductive material is reduced by using the trench structure, and the contact resistance and the cost of production are reduced.

Reference will now be made to the drawings to describe, in detail, embodiments of the present capacitive touch screen.

Figure 1:
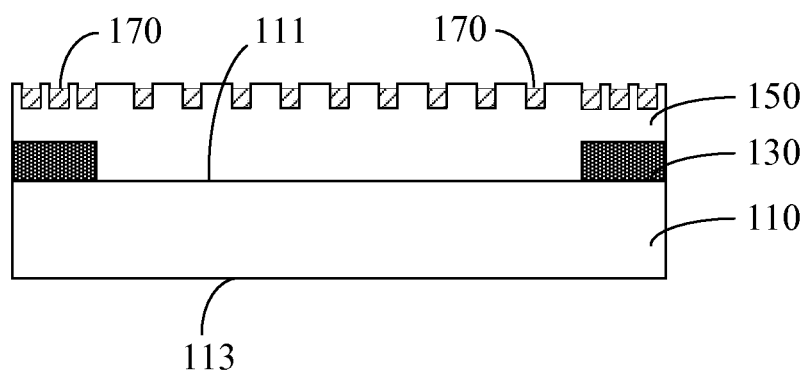
FIG. 1 is a schematic, cross-sectional view of a capacitive touch screen in accordance with an embodiment.
Figure 2:
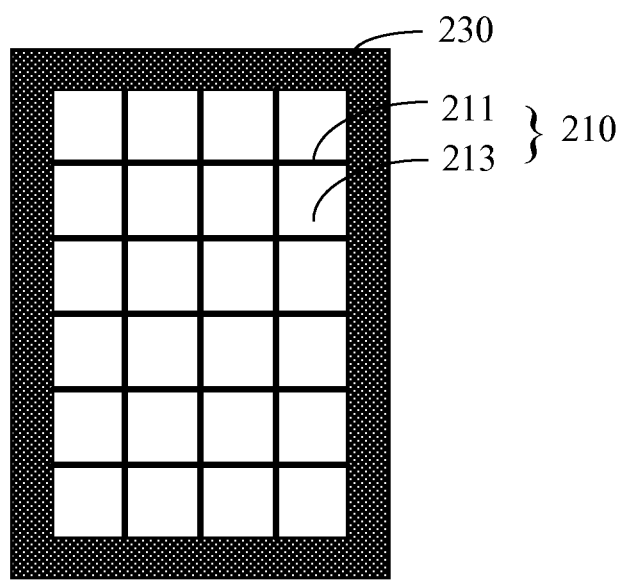
FIG. 2 is a top elevational view of a capacitive touch screen in accordance with an embodiment.

FIG. 1 shows a schematic view of a capacitive touch screen in accordance with an embodiment, FIG. 2 shows a schematic view of a capacitive touch screen in accordance with an embodiment.

Referring to FIG. 1, the capacitive touch screen includes a transparent substrate 110, a light-shield layer 130, a transparent polymer layer 150, and a conductive material 170. The transparent substrate 110 includes a first surface 111 and a second surface 113, the light-shield layer 130 is formed on the first surface 111 of the transparent substrate 110, the light-shield layer 130 forms an non-visible area (not shown) on the first surface 111 of the transparent substrate 110. The transparent polymer layer 150 is coated on the first surface 111 of the transparent substrate 110, and covers the non-visible area, the transparent polymer layer 150 is opposite to the first surface 111 of the transparent substrate 110, the part of the transparent polymer layer 150 covering a light-transmission area (not shown) of the transparent substrate 110 forms a sensing area 210 (referring to FIG. 2), a surface of the sensing area 210 is patterned to form a first meshed conductive trench 211, the conductive trench 211 is filled with a conductive material 170.

In the capacitive touch screen, the conductive material 170 coated on a surface of the capacitive touch screen is replaced by the meshed sensing area 210, when the capacitive touch screen is in use or production process, the meshed structure of the sensing area 210 can avoid scratching the conductive material 170, and reduce the use of the conductive material 170 and the cost, and the surface resistance of the capacitive touch screen is reduced.

Specifically, the conductive material 170 is a conductive nano-metal, such as nano-silver, nano-copper and the like. The nano metal particles is dissolved in the ink, the ink of nano-particles is coated into the conductive trench 211 by using a coater, and then air-dried. Referring to FIG. 1, the depth of the air-dried nano metal particles in the conductive trench 211 is lower than the plane of the mesh, usually by about 1 μm. it can further avoid scratching the capacitive touch screen in use Without impacting its conductivity function. After the air-dried, the surface of the capacitive touch screen is washed, the residual nano metal particles on the surface of the transparent polymer layer 150 is removed.

Specifically, a width of the conductive trench 211 is defined as d1, the depth is defined as h, 1 μm≤d1≤5 μm, 2 μm≤h≤6 μm, and a ratio of the depth to the width is greater than 1, i.e. h/d1>1. As the conductive material 170 is nano-metal, the conductive trench 211 filled with the conductive material 170 is opaque due to the nano-metal particles are opaque and as a solute in ink. The width of the conductive trench 211 ranges from 1 μm to 5 μm, which is very small, such that it can be as the basis of keeping the transmittance of the capacitive touch screen; the ratio of the depth to the width of the conductive trench 211 ranges greater than 1, which can further ensure the conductivity of the conductive trench 211, and the sensitivity of the sensing area 210 is improved.

Specifically, the width of the conductive trench 211 can be 1 μm, 3 μm or 5 μm, the corresponding depth can be 2 μm, 4 μm, 6 μm, respectively, the corresponding ratio of the depth to the width is greater than 1. The depth and width of the conductive trench 211 can be any value within the corresponding limit as long as guaranteeing the ratio of the depth to the width being greater than 1.

The first mesh 213 formed by the conductive trench 211 is a regular graph, specifically, which can be a regular polygon. Referring to FIG. 2, the first mesh 213 being an equilateral quadrilateral of the capacitive touch screen is shown. A side length of the equilateral polygonal mesh is defined as a, and 150 μm≤d1≤500 μm, i.e. the length of the side of the regular polygonal mesh can be any value between 150 μm and 500 μm. In alternative embodiments, the shape of the first mesh 213 can be other regular polygon or other regular graphic.

Figure 5:
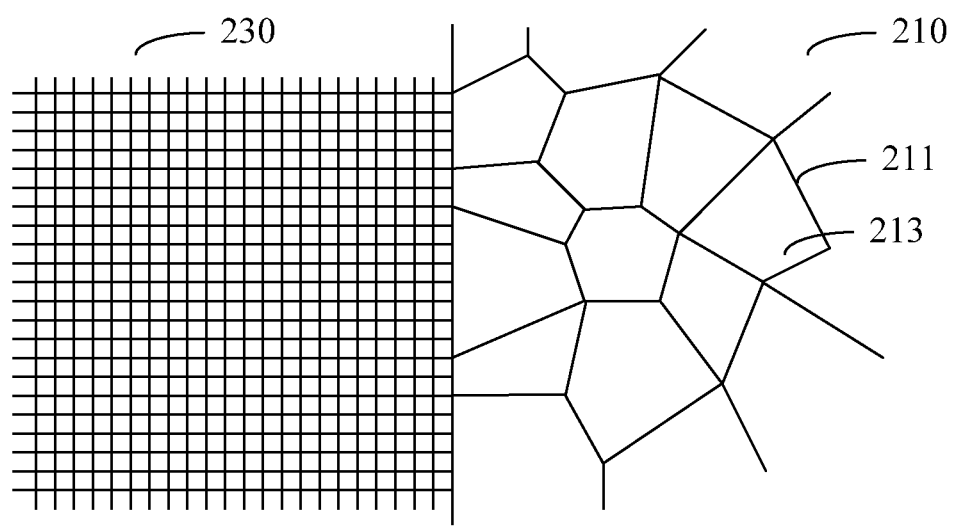
FIG. 5 is partial, schematic view of a connection of the sensing area and the traces area in accordance with another embodiment.

In alternative embodiments, the first mesh 213 formed by the conductive trench 211 can be a random and irregular graphic (refer to FIG. 5).

In a preferred embodiment, a ratio of the coverage area of the conductive material 170 (i.e. the surface area of the conductive trench 211) to the sum area of the surface of the first mesh is less than 5%. The ratio of the coverage area of the conductive material 170 to the sum area of the surface of the first mesh is defined less than 5%, i.e. the ratio of the surface of the conductive trench 211 in the sensing area 210 is defined, the light transmittance of the capacitive touch screen is further ensured by limiting the width of the conductive trench 211 and the side length of the regular polygon. The light transmittance of the capacitive touch screen is ensured more than 89% by limiting the depth, the width, and the ratio of the depth to the width of the conductive trench 211, and further limiting the ratio of the surface of the conductive trench 211 to the sensing area 210.

Specifically, a width of the non-visible area is defined as d2, and 150 mm≤d2≤500 mm. The transparent polymer layer 150 is opposite to the first surface 111 of the transparent substrate 110, the part of the transparent polymer layer 150 covering the non-visible area forms a traces area 230 (referring to FIG. 2), a surface of the traces area 230 is patterned to form a second meshed traces trench 231 (referring to FIG. 3), a density of the second mesh 223 formed by traces trench 231 is greater than that of the first mesh formed by conductive trench 231.

Figure 3:
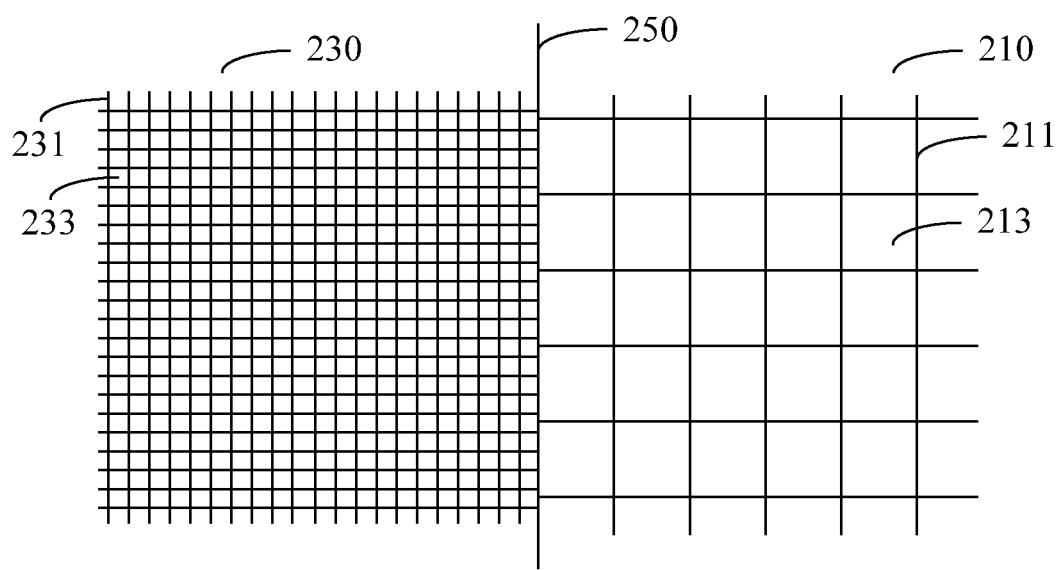
FIG. 3 is a partial, schematic view of a connection of the sensing area and the traces area in accordance with the embodiment shown in FIG. 2.
Figure 4:
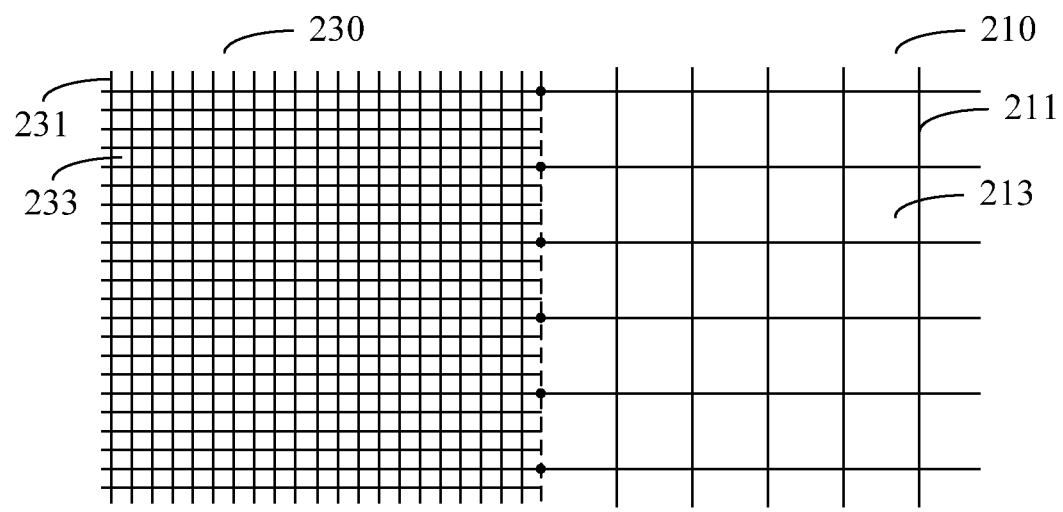
FIG. 4 is partial, schematic view of another connection of the sensing area and the traces area in accordance with the embodiment shown in FIG. 2.

Referring to FIG. 3, the sensing area 210 defines a connecting trench 250 on a portion connecting to the traces area 230, the connecting trench 250 is filled with the conductive material 170, the traces trench 231 is communicated with the conductive trench 211 by communicating with the connecting trench 250, respectively. The traces trench 231 is communicated with the conductive trench 211 via the connecting trench 250, the conductive trench 211, the traces trench 231 and the connecting trench 250 are filled with the conductive material 170, when the fingers touch the sensing area 210, the current outflow from the conductive trench 211, and through the connecting trench 250 to the traces trench 231, which can be as the basis of determining a position of the finger. In alternative embodiments, the conductive trench 211 and the traces trench 231 are communicated via a node (referring to FIG. 4).

In the production of the capacitive touch screen, both the conductive trench 211 and the traces trench 231 can be made by imprinting technology. The conductive trench 211 can be communicated with the traces trench 231 via a node or the connecting trench 250 as needed.

Figure 6:
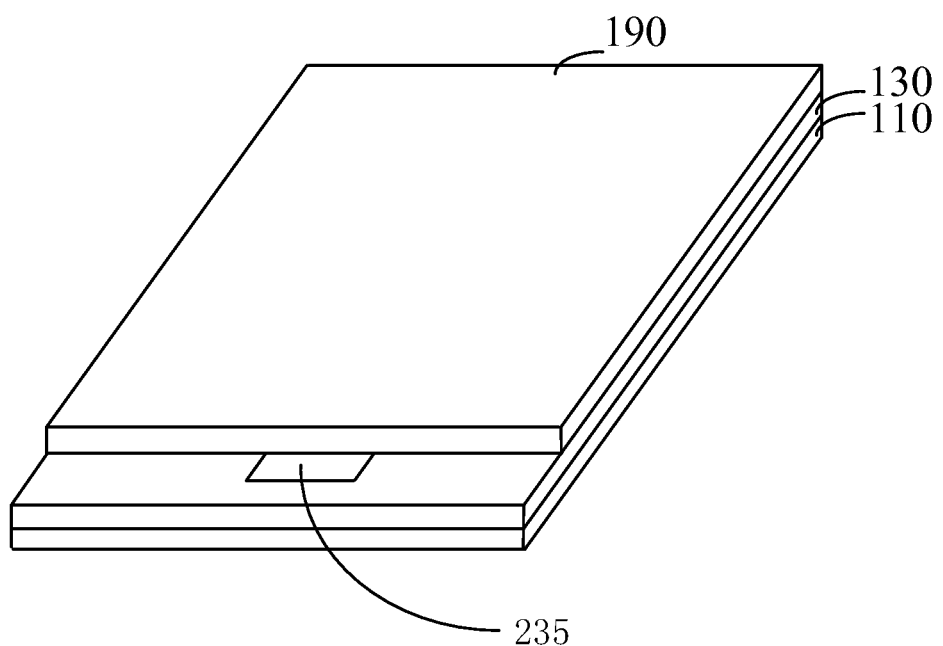
FIG. 6 is a schematic view of a capacitive touch screen in accordance with another embodiment.

Furthermore, referring to FIG. 6, the traces area 230 is provided with a lead output end 235, which is located on any sides of the outer edge of the traces area to connect with the outside for outputting the induced current conducted by the capacitive touch screen in use.

Referring to FIG. 6, the capacitive touch screen further includes a transparent protective layer 190, the transparent protective layer 190 covers the surface of transparent polymer layer 150 removed the part of the lead output 235 of the traces area 230, the transparent protective layer 190 is made of material selected from the group consisting of UV adhesive, embossing adhesive, and polycarbonate, which is used for protecting the conductive material 170 in the conductive trench 211 of the sensing area 210, and extending the life of capacitive touch screen.

Specifically, the transparent polymer layer 150 is made of material selected from the group consisting of UV adhesive, embossing adhesive, and polycarbonate, or other material with the same function.

The UV adhesive is also known as shadowless adhesive, photosensitive adhesive, UV curable adhesive, the shadowless adhesive is a kind of adhesives which can be cured by being irradiated with ultraviolet light, it can not only be used as a adhesive, but can also be used a paint, coating, ink and other plastic materials. UV is the abbreviation of the word of ultraviolet, i.e. UV light.

The polycarbonate (PC) is a polymer containing a carbonic acid ester group in the molecular chain, based on the structure of the ester group, it can be divided into the types of aliphatic, aromatic, aliphatic-aromatic and others.

Specifically, the light-shield layer 130 is made of ink, the transparent substrate 110 is a transparent glass, the non-visible area can be formed by screen printing black glass with a screen printer on the edge of the glass.

It should be understood that the descriptions of the examples are specific and detailed, but those descriptions can't be used to limit the present disclosure. Therefore, the scope of protection of the invention patent should be subject to the appended claims.

What is claimed is:

1. A capacitive touch screen, comprising:
a transparent substrate comprising a first surface and a second surface opposite to the first surface; a light-shield layer formed on the edge of the first surface of the transparent substrate, the light-shield layer forming a non-visible area on the first surface of the transparent substrate; and a transparent polymer layer formed on the first surface of the transparent substrate covering the light-shield layer, wherein the transparent polymer layer is opposite to the first surface of the transparent substrate, a part of the transparent polymer layer covering a light-transmission area of the transparent substrate forms a sensing area, a surface of the sensing area is patterned to form a first meshed conductive trench, the conductive trench is filled with a conductive material, wherein the transparent polymer layer is opposite to the first surface of the transparent substrate, a part of the transparent polymer layer covering the non-visible area forms a traces area, a surface of the traces area is patterned to form a second meshed traces trench, the traces trench is filled with the conductive material, and wherein the traces trench of the traces area is communicated with the conductive trench of the sensing area via a node.

2. The capacitive touch screen according to claim 1, wherein a width of the trench is defined as d1, a depth of the trench is defined as h, $1\ \mu m \leq d1 \leq 5\ \mu m$, $2\ \mu m \leq h \leq 6\ \mu m$, $h/d1 > 1$.

3. The capacitive touch screen according to claim 1, wherein the conductive material is nano-conductive metal.

4. The capacitive touch screen according to claim 3, wherein a ratio of the area covered by the conductive material and the sum area of the first mesh is less than 5%.

5. The capacitive touch screen according to claim 1, wherein the first mesh is a polygon mesh, a side length of the polygonal mesh is defined as a, $151\ \mu m \leq d1 \leq 500\ \mu m$.

6. The capacitive touch screen according to claim 1, wherein a width of the non-visible area is defined as d2, $150\ mm \leq d2 \leq 500\ mm$.

7. The capacitive touch screen according to claim 1, wherein the sensing area defines a connecting trench on a portion connecting to the traces area, the connecting trench is filled with the conductive material, the traces trench is communicated with the conductive trench by communicating with the connecting trench, respectively.

8. The capacitive touch screen according to claim 1, wherein a density of the second mesh formed by the traces area is greater than a density of the first mesh formed by the sensing area.

9. The capacitive touch screen according to claim 1, further comprising a transparent protective layer, wherein the transparent protective layer covers the surface of transparent polymer layer removed the part of the lead output of the traces area.

10. The capacitive touch screen according to claim 9, wherein the transparent protective layer is made of material selected from the group consisting of UV adhesive, embossing adhesive, and polycarbonate.

11. The capacitive touch screen according to claim 1, wherein the transparent polymer layer is made of material selected from the group consisting of UV adhesive, embossing adhesive, and polycarbonate.

12. The capacitive touch screen according to claim 1, wherein the light-shield layer is made of ink.

13. The capacitive touch screen according to claim 1, wherein the transparent substrate is glass.

* * * * *